(12) United States Patent
Kropp et al.

(10) Patent No.: US 8,766,139 B2
(45) Date of Patent: Jul. 1, 2014

(54) ENGINE-DRIVEN AIR COMPRESSOR LOAD CONTROL SYSTEM AND METHOD

(75) Inventors: Eric M. Kropp, Oshkosh, WI (US);
Daniel C. Fosbinder, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 1569 days.

(21) Appl. No.: 11/742,378

(22) Filed: Apr. 30, 2007

(65) Prior Publication Data
US 2008/0264921 A1    Oct. 30, 2008

(51) Int. Cl.
*B23K 9/10* (2006.01)

(52) U.S. Cl.
USPC .......................................................... 219/133

(58) Field of Classification Search
USPC .......................................................... 219/133
See application file for complete search history.

(56) References Cited

U.S. PATENT DOCUMENTS

| | | | |
|---|---|---|---|
| 3,514,219 A | 5/1970 | Mitchell et al. | |
| 6,603,097 B2 | 8/2003 | Leisner | |
| 6,989,509 B2 * | 1/2006 | Silvestro | 219/133 |
| 7,098,424 B2 * | 8/2006 | Silvestro | 219/133 |
| 2005/0133489 A1 | 6/2005 | Gitter et al. | |
| 2005/0263513 A1 | 12/2005 | Leisner | |
| 2005/0263515 A1 | 12/2005 | Fosbinder | |
| 2006/0016791 A1 | 1/2006 | Fosbinder | |
| 2006/0027547 A1 * | 2/2006 | Silvestro | 219/133 |
| 2006/0157459 A1 | 7/2006 | Fosbinder | |

OTHER PUBLICATIONS

U.S. Appl. No. 11/742,311, Oct. 30, 2008, Helf et al.
U.S. Appl. No. 11/742,399, Oct. 30, 2008, Fosbinder.

* cited by examiner

*Primary Examiner* — Henry Yuen
*Assistant Examiner* — Ayub Maye
(74) *Attorney, Agent, or Firm* — Fletcher Yoder P.C.

(57) ABSTRACT

A system, in one embodiment, includes an engine, a generator coupled to the engine, a compressor coupled to the engine, and a controller configured to soft start the compressor. A method, in another embodiment, includes soft starting an air compressor in a portable welding unit having the air compressor, an engine coupled to the air compressor, and a welding generator coupled to the engine.

8 Claims, 5 Drawing Sheets

FIG. 5

ENGINE-DRIVEN AIR COMPRESSOR LOAD CONTROL SYSTEM AND METHOD

BACKGROUND

The invention relates generally to welding systems and more particularly to welding systems utilizing an engine coupled to an air compressor and welding generator in a single unit.

Welding systems generally use an electrical current (e.g., welding current) to perform welding. The electrical current may be provided by an electrical power source (such as a power grid or battery) or an electrical generator coupled to a mechanical power source. Examples of mechanical power sources include engines that output power via a rotating drive shaft. Typically, the drive shaft is coupled to other devices that consume the energy provided by the rotating drive. For instance, welding systems often include internal combustion engines (such as gas or diesel engines) and an alternator or generator configured to convert the mechanical energy generated by the engine into electrical energy (e.g., electrical current). These systems are often referred to as engine-driven welding generators. An advantage of an engine-driven system is the potential portability of the system. For instance, welding systems that employ a generator coupled to an engine are typically configured as standalone units that do not have connections to a supplemental power source, such as a power grid. This may be useful for systems that are traditionally operated at remote worksites.

In addition to needing a source of welding current at a worksite, welding operators often desire other outputs to more efficiently complete a job. For example, a welding operator may also use compressed air to operate plasma cutters, air tools and the like. Typically, compressed air is provided via a standalone air supply. Thus, a welding operator may use, both, a standalone engine-driven welding generator and a standalone air supply. The independence of the two units may increase the amount of time and labor involved with setup, transportation, and so forth. In addition, the independence of the two units may result in an increased amount of maintenance and repair costs due to duplication of parts. Unfortunately, existing welding generators may not perform properly with the addition of an air compressor due to the increased load on the engine. For example, the increased load due to an air compressor may result in a drop in power output to a welding torch, which can cause problems with the welding process.

BRIEF DESCRIPTION

A system, in one embodiment, includes an engine, a generator coupled to the engine, a compressor coupled to the engine, and a controller configured to soft start the compressor. A method, in another embodiment, includes soft starting an air compressor in a portable welding unit having the air compressor, an engine coupled to the air compressor, and a welding generator coupled to the engine.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
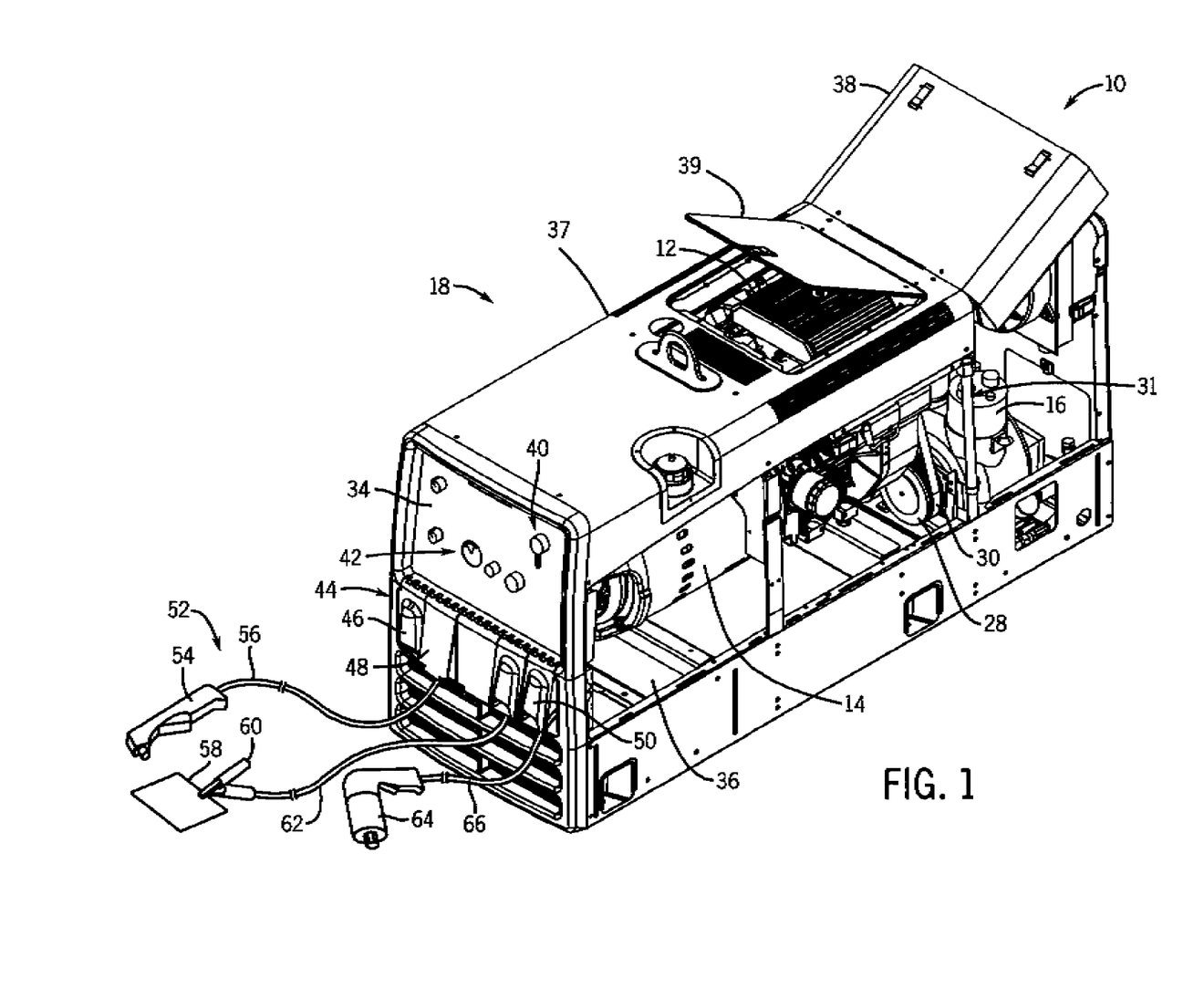
FIG. 1 is a partial perspective view of an exemplary engine-driven welding generator/compressor system, wherein two top access panels are rotated to open positions and a side access panel is removed to reveal various internal features in accordance with embodiments of the present invention.
Figure 2:
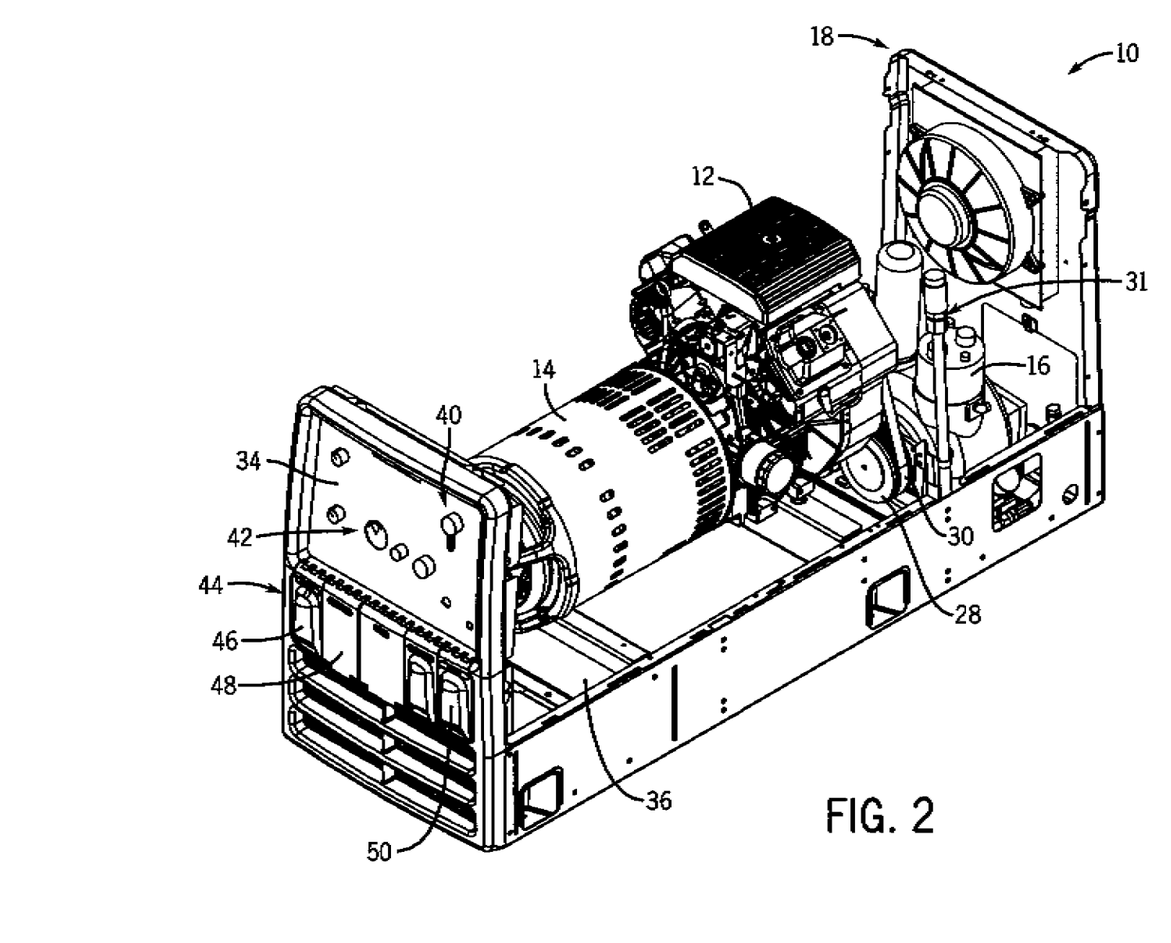
FIG. 2 is another partial perspective view of the welding generator/compressor system as illustrated in FIG. 1, wherein an entire top access panel assembly is removed to further illustrate various internal features in accordance with embodiments of the present invention.
Figure 3:
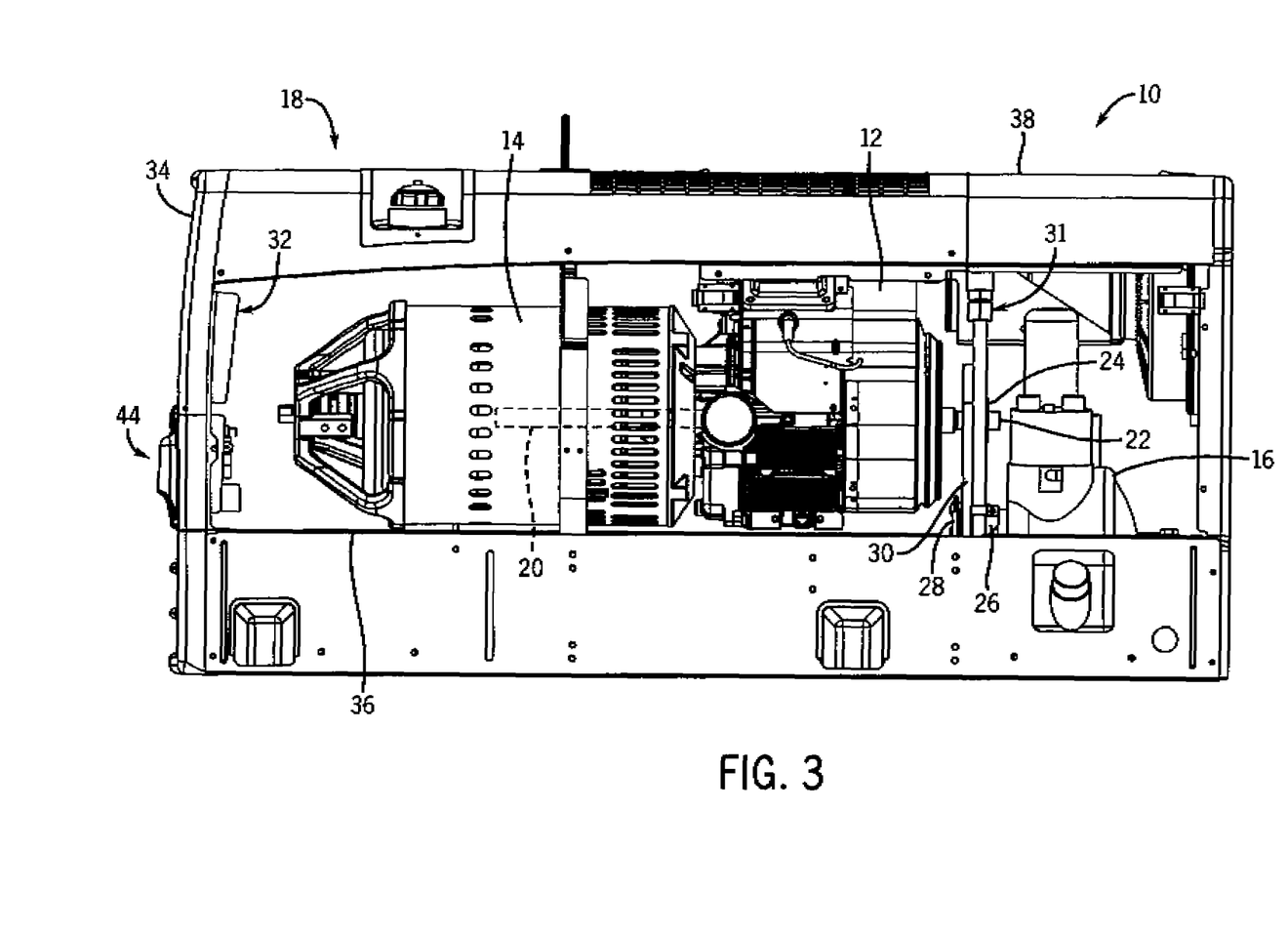
FIG. 3 is a side view of the welding generator/compressor system as illustrated in FIG. 1, wherein the two top access panels are rotated to closed positions and the side access panel is removed to further illustrate various internal features in accordance with embodiments of the present invention.

Referring now to the drawings, FIGS. 1-3 illustrate an engine-driven welding generator/compressor system 10 having an engine 12 drivingly coupled to a welding generator 14 and an air compressor 16 in a single enclosure 18 in accordance with an exemplary embodiment of the present technique. FIG. 1 is a partial perspective view of the system 10 with side access panels removed and top access panels or hatches rotated to open positions. FIG. 2 is another partial perspective view of the system 10 as illustrated in FIG. 1, wherein the entire top access panel assembly is removed to provide a better view of the internal features of the system 10. FIG. 3 is a side view of the system 10 as illustrated in FIGS. 1 and 2. As depicted, the system 10 is configured to provide multiple outputs, including welding current, alternating current (AC) power, and compressed air.

As discussed in detail below, the illustrated system includes a variety of features to improve serviceability, reliability, controllability, and integration of the air compressor 16 within the single enclosure 18 of the system 10. For example, the illustrated system 10 may include a top side oil fill to enable access at the top of the system 10, rather than a lower or more inaccessible oil fill location. The illustrated system 10 also may include unique control features, such as a load priority control configured to monitor various loads (e.g., generator 14, compressor 16, external loads, etc.) on the engine 12, identify possible overload conditions, and adjust the various loads based on priority levels. The control features also may include a specific air compressor load control, which may be configured to reduce the engine speed and/or gradually engage (e.g., via a clutch) the air compressor 16 during start up (e.g., a soft start control). Furthermore, the control features may include a specific air compressor control regulator, which may be mounted directly on a control panel (e.g., a front panel) of the system 10 rather than being in an inaccessible position well within the system 10. The system 10 also may include a battery and/or a battery charge system, which may include features to monitor conditions of the battery (e.g., internal or external to the system 10) and to adjust the characteristics of the charge (e.g., variable output level, duration, etc.).

In an embodiment, discussed in greater detail below, the system 10 includes an electric clutch coupled to the compressor 16 drive shaft and an electronic governor configured to control the speed of the engine 12. As depicted, the electric clutch and the governor are both controlled by an electronic control. During operation of the system 10, the electronic control provides signals to coordinate the operating speed of the engine 12 and the operation of the air compressor 16. For example, as discussed below, the electronic control may direct the electronic governor to reduce the engine speed before engaging the electric clutch. Thus, the startup of the air compressor 16 may be accomplished during operation at lower engine speeds to prevent the shock-loading that may otherwise be present if the air compressor 16 is engaged while the engine 12 is operating at an increased operating speed. Further, embodiments discussed below include multiple control schemes and user inputs that may be employed to increase performance and the functionality of the system 10.

In certain embodiments, the system 10 may be described as an air pack welding system (e.g., AIRPAK). The engine 12 provides output power (e.g., a mechanical output) to drive both the welding generator 14 and the air compressor 16. In the illustrated embodiment, the generator 14 is coupled to one side of the engine 12, while the compressor 16 is independently coupled to an opposite side of the engine 12. Thus, the engine 12 is sandwiched between the generator 14 and the compressor 16. In addition, the engine 12 may be mounted independently from the compressor 16, such that the two are mechanically isolated from one another. As discussed in further detail below, the isolation between the compressor 16 and the engine 12 may be addressed with a suitable engine-to-compressor coupling system, such as a geometrically adjustable coupling. The geometrically adjustable coupling may include a tensioning system coupled to a belt and pulley system, a special resilient or spring-like belt, a clutch, or a combination thereof, to provide some degree of flexibility, positional adjustability, or play. Thus, the geometrically adjustable coupling is configured to maintain a connection between the compressor 16 and the engine 12 despite variations in distance, vibrations, and so forth. In other words, the geometrically adjustable coupling provides a resilient or distance adjustable connection between the engine 12 and the compressor 16

As described below, the power from the engine 12 operates both the generator 14 and the air compressor 16 via a first shaft 20 and a second shaft 22 (e.g., stub shaft), respectively. In some embodiments, these shafts 20 and 22 may be independent from one another, while in other embodiments shafts 20 and 22 may be part of a single shaft extending through the engine 12. As illustrated, the shafts 20 and 22 extend out of opposite sides of the engine 12. These shafts 20 and 22 may be directly or indirectly coupled to one or more driven mechanisms. For example, an indirect coupling may include a belt and pulley system, a gear system, or a chain and sprocket system. In the present embodiment, the first shaft 20 couples directly to the generator 14, while the second stub shaft 22 couples indirectly to the compressor 16. However, either arrangement can be used for the connection between the engine 12 and the generator 14 and/or the compressor 16.

For example, as will be discussed in greater detail below, the engine 12 is coupled to the compressor 16 via a belt and pulley system including the stub shaft 22, a pulley 24 coupled to the shaft 22, a compressor drive shaft 26 coupled to the compressor 16, a compressor pulley 28 coupled to the shaft 26, and a drive belt 30 extending about the pulleys 24 and 28. Therefore, the engine 12 is capable of providing power to the generator 14 and the air compressor 16 simultaneously. In the illustrated embodiment, the engine 12 rotates the stub shaft 22 to transmit rotation and torque via the pulleys 24 and 28 and drive belt 30 to the compressor drive shaft 26 coupled to the air compressor 16. Accordingly, the mechanical energy generated by the engine 12 operates the air compressor 16. As discussed in detail below, in certain embodiments, the air compressor 16 includes a rotary screw compressor. Thus, the air compressor 16 and the system 10 may be capable of continuously providing large volumes of compressed air 16 to a desired application, such as a welding application, without any need for an intermediate storage tank.

The engine 12 includes a power source configured to provide power to the generator 14 and the air compressor 16. In an embodiment, the engine 12 may include a combustion engine powered by gas, diesel, LP fuel, natural gas, or other fuels, and driving one or more drive shafts, e.g., 20 and 22. For example, the engine 12 may include an industrial gas/diesel engine configured to output anywhere from about 24 horsepower (Hp) to about 64 Hp. Generally, the weight of such an engine 12 may vary with the size and Hp rating of the engine. For example, a 64 Hp diesel engine driven unit may weigh approximately 1900 lbs., whereas a similar 24 Hp gasoline engine driven unit may weigh less than approximately 1000 lbs. Thus, the portable system 10 may benefit from the use of a smaller engine 12.

As discussed previously, embodiments may include a generator 14 coupled to the engine 12. Thus, the generator 14 may convert the power output (e.g., mechanical energy) of the engine 12 to electrical power. Generally, the generator 14 includes a device configured to convert a rotating magnetic field into an electrical current (e.g., AC generator). The generator 14 includes a rotor (rotating portion of the generator) and a stator (the stationary portion of the generator). For example, the rotor of the generator 14 may include the rotating drive shaft 20 disposed in a single stator configured to create an electrical current (e.g., welding current) from the rotation of the magnetic field. In an embodiment, the generator may include a four-pole rotor and three-phase weld output configured to provide beneficial welding characteristics. Further, the generator 14 may include a plurality of independent winding sections in the rotors and/or stators, such that the generator 14 is configured to output multiple electrical outputs having different characteristics. For example, the generator 14 may include a first section configured to drive a welding current to a welder and a second section configured to drive a current for other AC outputs. As suggested above, multiple generators 14 may be connected to the drive shaft 20 or stub shaft 22.

Also coupled to the engine 12, the air compressor 16 may provide a continuous source of compressed air for use in plasma cutting, pneumatic tools, inflating a tire, blowing-off/cleaning a work piece, and the like. For example, a welding operator may use compressed air as a high speed gas ejected from the nozzle of a plasma torch, or may use compressed air to operate tools, such as pneumatic impact wrenches, pneumatic spray guns, pneumatic lifts, and pneumatic air chisels. In the illustrated embodiment, the air compressor 16 may be described as a continuous air supply compressor, an indirect mount air compressor, or both. For example, certain embodiments of the system 10 use a type of the compressor 16 that is not a piston-type air compressor mounted directly to the engine 12. In an embodiment, the air compressor 16 may include a rotary screw compressor or another suitable compressor 16 configured to supply a continuous flow of compressed air without the need for an intermediate storage tank.

Rotary screw compressors may include a type of gas compressor that has a rotary type positive displacement mechanism. The rotary screw compressor typically includes one or more screws, which rotate within an enclosure to gradually shrink a series of passages defined by threads of the screws and the surrounding enclosure. For example, the rotary screw compressor may include a plurality (e.g., pair) of counter rotating screws, which intermesh with one another to progressively reduce air volumes between the intermeshed threads (e.g., a series of shrinking volumes of air). For example, air is drawn in through an inlet port in the enclosure, the gas is captured in a cavity, the gas is compressed as the cavity reduces in volume, and the gas is finally discharged through another port in the enclosure. The design of a rotary screw air compressor 16 generally provides for high volumes of compressed gas in a continuous manner without the need for an intermediate storage tank.

Accordingly, the rotary screw air compressor 16 may provide a direct supply of compressed air on-demand to a desired application. For example, a plasma cutter may consume air directly from the unit without the air being compressed into a tank, as generally done by piston-driven air compressors. However, an embodiment including a rotary screw air compressor 16 may include an air tank configured to store the compressed air. For example, a user may want to generate air for a given period and store the compressed air for a later use.

Further, the rotary screw air compressor 16 may be configured to operate at high speeds and, thus, may use less gearing and space to couple the rotary screw air compressor 16 to the engine 12. For example, in an embodiment, the system 10 may include a rotary screw air compressor 16 operating at speed near the engine speed, such as 4000 rpm. Thus, the pulley 24 and the compressor pulley 18 may include similar 1 to 1 ratios and not use a significantly larger compressor pulley 28 to step down the engine speed to accommodate the air compressor 16.

The system 10 may also have an oil fill assembly 31 that enables a user to perform regular maintenance on the air compressor 16. For example, as depicted, the oil fill assembly 31 may include a configuration to provide improved access to components of the air compressor 16 that may otherwise be obscured by other devices within the system 10. Accordingly a user may easily check and add fluids to the air compressor 16. For example, the oil fill assembly 31 may be described as an extension, add-on, or retrofit system configured to relocate the oil fill location from well within the system 10 to a top access location.

The system 10 may also include control circuitry to coordinate functions of a plurality of devices. For example, as depicted in FIGS. 1-3, the system 10 includes control circuitry 32 in the vicinity of a control panel 34. In an embodiment, the control circuitry 32 may include a processor, memory, and software code configured to control and or coordinate operation of the system 10. For example, the control circuitry 32 may monitor and control the speed and load on the engine 12, the electrical output and loads on the generator 14, the air output and loads on the compressor 16, the startup procedures (e.g., soft start of compressor 16), and/or the like. For example, as mentioned above, the control circuitry 32 may identify an overload condition in response to sensed data, and then reduce the output to protect the system 10. The control circuitry 32 also may reduce the engine speed, gradually increase the engine speed, and/or gradually engage a clutch during start up of the compressor 16. The control circuitry 32 also may automatically adjust the outputs (e.g., compressed air output or electrical output) based on default or user defined priority levels, minimum workout output levels, maximum output levels, safety features, and so forth. The control circuitry 32 also may adjust output levels (e.g., compressed air output or electrical output) based on a particular application, sensed feedback, and other closed-loop controls. For example, the control circuitry 32 may gradually decrease an electrical output for a battery charging procedure based on sensed feedback from the battery, thereby maximizing the charge without overcharging the battery.

As depicted in FIGS. 1-3, the enclosure 18 includes a common base or frame 36 with various access panels to enable servicing, repair, and so forth. For example, a pair of side access panels (removed) is configured to attach to opposite sides of the frame 36. A top 37 of the enclosure 18 includes first and second access panels or hatches 38 and 39, which are both rotatable between open and closed positions above the components of the system 10. As illustrated, the first hatch 38 can rotate open to enable access to the compressor 16, the oil fill assembly 31, and other features. The second hatch 39 can rotate open to enable access to the engine 12 and other features.

As depicted, the control panel 34 is coupled to an end of the enclosure 18 near the generator 14. The control panel 34 may include various control inputs, indicators, displays, electrical outputs, air outputs, and so forth. In an embodiment, a user input 40 may include a knob or button configured for a mode of operation, an output level or type, etc. For instance, the user input 40 may include a dial to select a mode of operation, such as a DC weld, an AC weld, a battery charge, or an air tool operation. The control panel 34 may also include various indicators 42 to provide feedback to the user. For example, the indicator 42 may include an LCD, LED, or Vacuum Florescent display to display voltage, amperage, air pressure, and the like. Embodiments of the control panel 34 include any number inputs and outputs, such as welding methods, air compressor settings, oil pressure, oil temperature, and system power. Further, the user inputs 40 and indicators 42 may be electrically coupled to the control circuitry 32 and enable a user to set and monitor various parameters within the control circuitry 32 and other devices of the system 10.

The illustrated system 10 also includes various external connections 44. The external connections 44 may include various outlets and couplers configured to provide access to the electrical power and the compressed air generated by the system 10. For example, the illustrated external connections 44 include an AC power output 46, a DC power output 48, and a compressed air output 50. In an embodiment these outputs 46, 48 and 50 are coupled to various devices and tools. For example, the AC power output 46 or the DC power output 48 can be coupled to various welding and cutting tools 52. As depicted, the welding/cutting tools 52 included a torch 54 coupled to the external connection 44 via a supply conduit 56. For instance, the welding devices may receive current from the generator 14 via the external connections 44. In such an embodiment, the torch 54 may be used to weld or cut a work piece 58 coupled to the external connections 44 via a work clamp 60 and a cable 62. As will be appreciated, the torch 54 may include various welding devices, such as a TIG (tungsten inert gas) torch, a MIG (metal inert gas) gun, or a plasma cutting torch. Similarly, the system 10 may provide compressed air from the air compressor 16 via the compressed air output 50. For example an air tool 64 may be coupled to the compressed air output 50 via an air hose 66. The air hose 66 may exit the system 10 at various other locations; including the back of the system 10 proximate to the air compressor 16. The air tool 64 may include various pneumatic tools and the like. In another embodiment, a plasma cutting torch 54 may receive power from an external unit (e.g., wall outlet AC power) while receiving compressed air from the air compressor 16 of the system 10.

As discussed previously, the system 10 may include multiple components working in cooperation to generate power, compressed air, and other outputs. For example, in the illustrated embodiment, a single engine 12 is coupled to the generator 14 and the air compressor 16. As will be appreciated, mechanical design of such a system 10 may entail various arrangements of components to provide an efficient and reliable system 10. For example, the operator may turn on the air compressor 16 which, in turn, engages a clutch to enable the air compressor 16 to draw power from the engine 12. As will be appreciated, the loading of the devices, such as the air compressor 16, may be substantial depending on the specific requirements of each device. For instance, the air compressor 16 may use a significant amount of power to maintain a minimum oil pressure to circulate cooling oil. Increased loads may prove difficult for the engine 12 to handle at start-up. Similarly, if the air compressor 16 is engaged when the engine 12 is running at an operating speed, the load of the air compressor 16 ramping up to the engine operating speed may create a significant shock to the system 12. Accordingly, engaging the air compressor 16 at a high engine speed may increase wear on the system components, including the engine 12, the drive belt 30, the clutch mechanism and the base/frame 36. The following discussion provides a system 10 and control method configured to control operations of the engine 12, the electronic governor, the air compressor 16 and the clutch when engaging an additional device, such as the air compressor 16.

Figure 4:
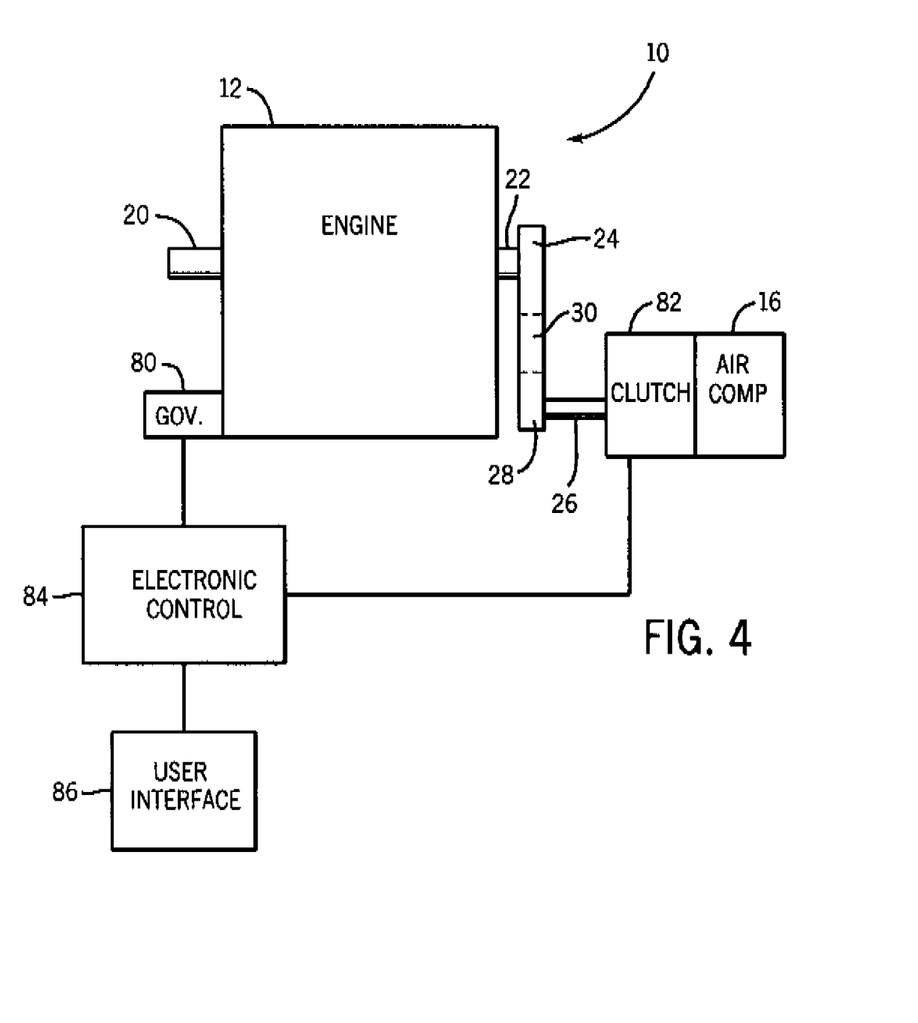
FIG. 4 is a schematic of an exemplary embodiment of the welding generator/compressor system as illustrated in FIGS. 1-3.

FIG. 4 illustrates a block diagram of the system 10, including the engine 12, the air compressor 16, a governor 80, a clutch 82 an electronic control 84, and a user interface 86. In this configuration, the engine speed may be regulated by the governor 80, and the transfer of the torque from the engine 12 to the air compressor 16 may be regulated by the clutch 82. As will be discussed in detail below, with reference to FIG. 5, the electronic control 84 may implement a control algorithm to coordinate the operation of the governor 80 and the clutch 82 based on various inputs and parameters. The electronic control 84 also may include at least one welding control feature, or the control 84 may be part of the control circuitry 32 or an overall welding control assembly of the system 10.

The governor 80 is generally configured to regulate the speed of the engine 12, e.g., revolutions per minute (rpm), based on a desired level. In an embodiment, the governor 80 may include an electronic governor configured to control the engine 12 based on the input control signals and monitored engine parameters. For example, the governor 80 may receive a control signal commanding a given speed and the governor 80 may then generate an output signal to control the throttle of the engine 12. The output may include an electrical control of the engine 12 or may include mechanical actuation of a throttle of the engine 12.

The control signal may be generated by the electronic control 84. In such an embodiment, the control signal may be produced based on a control algorithm embedded within the electronic control 84. For example, the electronic control 84 may monitor the operating speed and command the governor 80 to increase or decrease the speed of the engine 12 accordingly. In other embodiments, the governor 80 may include an onboard control loop (such as a proportional-integral-derivative controller (PID controller)) that regulates the output to the engine 12. Thus, the governor 80 can independently regulate the engine 12 to meet the parameters requested by the control signal output by the electronic control 84. In other words, the governor 80 may receive a signal requesting a given speed and implement its own routine to regulate the engine 80 to the desired speed. The governor 80 may include any mechanism configured to receive a control signal and regulate the engine 12 based on the signal.

The governor 80 may be mounted to the system 10 in various configurations that enable the governor 80 to regulate the engine 12. In an embodiment, the governor 80 may be mechanically coupled to the engine 12. Mechanically coupling the governor 80 to the engine 12 enables the governor 80 to manipulate components of the engine 12, including a carburetor throttle shaft, and the like. Mechanically coupling the governor 80 may include providing an engine 12 with the governor 80 built into the engine 12, directly attaching the governor 80 to the body of the engine 12, or providing the governor 80 as a separate component with a linkage to the engine 12. Other embodiments may include electrically coupling the governor 80 to a control circuitry located within the engine 12.

The clutch 82 is configured to control the transfer of power from the engine 12 to the air compressor 16. The power transferred may include mechanical power in the form of torque. As depicted in FIGS. 1-4, the engine 12 includes the drive shaft 20 and the stub shaft 22, which are both rotated by the engine 12. For simplicity, the remainder of the discussion refers to the transfer of power via the shaft 22, although similar systems may also make use of the shaft 20. The shaft 22 is coupled to the compressor drive shaft 26 via the drive belt 30, the pulley 24, and the compressor pulley 28. Accordingly, the power from the engine 12 is received by the air compressor 16 as torque. The clutch 82 is positioned between the engine 12 and the air compressor 16, and is configured to control the transfer of torque between the engine 12 and the air compressor 16. Configuring the clutch 82 to transfer the torque is generally referred to as engaging the clutch 82. As mentioned previously, the power required to operate the compressor 16 may increase the demand for power from the engine 12. Accordingly, engaging the clutch 82 increases the overall load on the engine 12, while disengaging the clutch 82 decreases the load of the air compressor 16 on the engine 12.

The clutch 82 may include any device configured to regulate the amount of torque transferred between the engine 12 and the air compressor 16. For example, an embodiment includes an electric clutch that has two electromagnetic plates complementary to one another. In such an arrangement, the clutch 82 may enable or disable in response to a control signal. For example, if the clutch 82 receives a signal to engage, the electromagnetic plates may be energized to draw the two plates together and create a friction. Energizing the plates may include a digital input configured to fully engage or disengage the clutch 82 or an analog input configured to provide a proportional friction and, thus a proportional transfer of torque. For example, a digital signal may cause the two plates to energize fully and provide a full friction. An analog signal may enable the plates to partially energize and, thus, vary the amount of friction generated in the clutch. In an embodiment, the signal configured to operate the clutch 82 may be generated by the electronic control 84. The clutch 82 may also include any other mechanisms configured to vary the amount of torque transferred between the engine 12 and the air compressor 16.

The location of the clutch 82 may be varied to accommodate any number of applications. As depicted the clutch 82 is located in-line with the compressor drive shaft 26. Similarly, the clutch 82 may be located in-line with the shaft 22 and be configured to enable or disable the transfer of torque to the pulley 24 and, thus, the torque provided to the compressor 16. Further, an embodiment may include the clutch 82 built into a pulley. For example, the pulley 24 or the compressor pulley 28 may include a clutch pulley configured to transfer torque via engagement in response to the control signal. Further, the system 10 may include a belt tensioning mechanism configured to increase or decrease the tension of the drive belt 30 based on the control signal. Accordingly, the control signal may be configured to generate a response to tension the drive belt 30 (i.e., enable the clutch).

The electronic control 84 is configured to coordinate operation of the system 10. In other words, the electronic control 84 monitors any number of inputs, and also outputs various commands to control the operating speed of the engine via the governor 80 and the power (i.e., torque) transferred to the air compressor 16 via the clutch 82. As depicted in FIG. 4, the electronic control 84 is electrically coupled to the governor 80 and the clutch 82. The electronic control 84 may be configured to transmit various parameters to the governor 80, including a speed control signal indicative of a desired engine operating speed. For example, the speed control signal may include a set level or value representative of the desired engine speed. In response to the speed control signal, the governor 80 may regulate the speed of the engine 12, as described previously.

The electronic control 84 may also be electrically coupled to the clutch 82 and configured to control engagement of the clutch 82 via a clutch signal. In an embodiment where the clutch 82 is configured to provide a digital clutch signal, the electronic control 84 may output a clutch signal above or below a threshold value to enable or disable the clutch 82. For example, based on the determination to engage or disengage the clutch 82, the electronic control 84 can output a digital high or digital low clutch signal. Similarly, in an embodiment of the clutch 82 that has the ability to incrementally vary the amount of torque transmitted, the electronic control 84 can output an analog signal proportional to the desired torque transfer. In such a configuration, the clutch signal may be configured to ramp up transferred torque to reduce the shock to the system 10 and the engine 12 as the air compressor 16 begins to draw power from the system 10.

Further, the electronic control 84 may receive and process various inputs. In an embodiment, inputs to the electronic control 84 may include any number of engine parameters and system parameters. For example, the electronic control 84 may receive signals indicative of actual engine speed, a signal relating to engine coolant temperature, engine oil temperature, system temperature, or other parameters related to the assessing the performance of the engine 12 and the system 10. These signals may be provided directly from the engine 12, the governor 80, or other components of the system 10, to the control circuitry 32.

Similarly, the electronic control 84 may receive feedback signals indicative of the current status of the air compressor 16 and the clutch 82. For example, the signals may verify that the clutch has engaged, indicate the actual speed of the air compressor 16, or the desired rotational speed of the compressor 16. Accordingly, the electronic control 84 may incorporate these signals into a control algorithm.

The system 10 may also incorporate user input via the user interface 86 in communication with the electronic control 84. In an embodiment, the user interface 86 may include a switch or a plurality of switches configured to turn the air compressor 16 off and on. For example, the user interface 86 may include a mechanical or digital switch that the user turns on to start the air compressor 16. Further, the user interface 86 may also include any number of inputs to increase the flexibility of the system. For example, user interface 86 may enable an operator to enter parameters relevant to a control algorithm implemented by the electronic control 84. The user interface 86 may be located on the control panel 34 or in other locations within the system 10. For instance, the user interface 86 may be located on the air compressor 16, proximate to the welding/cutting tools 52, or remote to the system 10.

The electronic control 84 may be a separate component in the system 10 or may be integrated with other components and devices within the system 10. In an embodiment, the electronic control 84 may include an additional device located within the system 10. For example, the electronic control 84 may include a processor and/or memory devices. Accordingly, the electronic control 84 may be configured to operate with minimal overlap with other control devices within the system 10. In another embodiment, at least a portion of the electronic control 84 may be located within other control devices contained within the system 10. For example, the processing of the electronic control 84 may be accomplished within the control circuitry 32 using a processor and memory located within the control circuitry 32.

Figure 5:
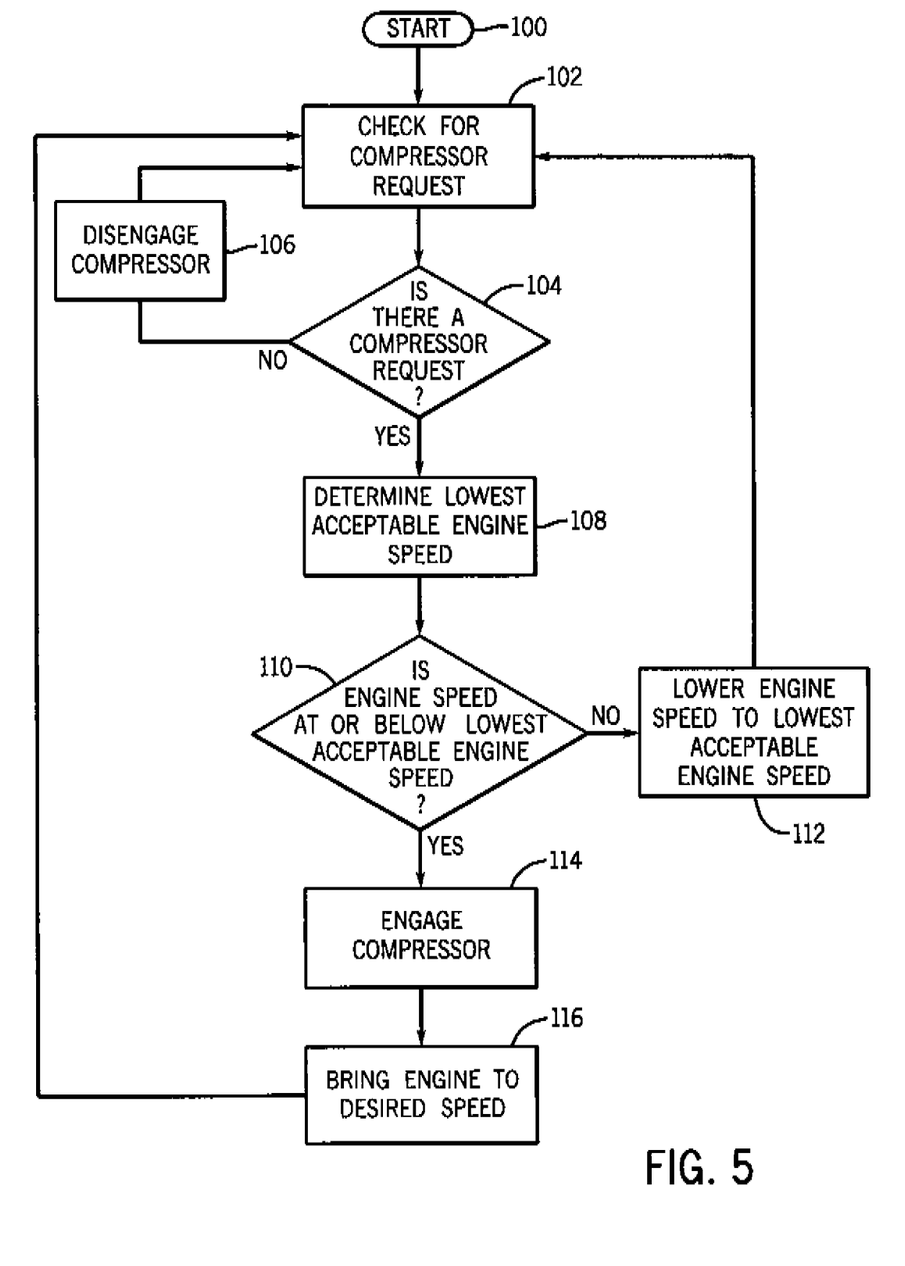
FIG. 5 is a flowchart illustrating an exemplary method of operating the engine-driven welding generator/compressor system as illustrated in FIGS. 1-3.

FIG. 5 includes a flowchart that illustrates an exemplary computer-implemented method to operate a welding generator/compressor system 10. The flowchart includes a method to check for a request to turn on the air compressor 16 followed by a routine to control the speed of the engine 12, and to engage or disengage the air compressor 16. For example, block 100 includes "start." Start 100 may include starting the system 10 which may include an operator turning on power to the system 10. For example, the user may flip a switch, such as the user interface 86, to start the engine 12. In one embodiment, the clutch 82 may be disengaged at startup to ensure that the engine 12 is started without the additional loading of the air compressor 16. For instance, the electronic control may maintain the clutch 82 in a disabled state until the electronic control 84 determines the system 10 is properly configured to support the startup load of the compressor 16. Embodiments may also include starting the system 10 with the clutch 82 in the same state that it was in when the system 10 was previously shutdown.

The system 10 may check for a compressor request, as indicated at block 102. For example, after the system 10 is started, the system 10 may scan for an input that is indicative of the desire to power the air compressor 16. In an embodiment, checking for a compressor request 102 may include the electronic control 84 checking the status of each input, including the user interface 86, to determine if a request to power the air compressor 16 has been received. For example, the electronic control 84 may query the status of a switch that an operator may turn on or off to start or stop operation of the air compressor 16. Further, inputs may include checking a memory within the electronic control 84 to determine if there was a compressor request when the system 10 was previously shutdown. For example, if the compressor 16 was on when the system 10 was last shutdown, the electronic controller 84 may detect a compressor request at startup of the system 10.

Based on the check for a compressor request 102, the system 10 may determine if there is a compressor request, as indicated by block 104, and may configure the electronic clutch 82 and/or the governor 80 based on the determination. The check for a compressor request 102 may be implemented after startup 100, as indicated by the arrow connecting block 100 and block 102, or the check may include a looping continuous check during run-time as indicated by the arrow connecting block 116 to block 102. For instance, if there is not a request for the compressor 16, the system may disengage the compressor, as depicted at block 106, and continue to check for a compressor requests at block 102. Disengaging the compressor 16 may include leaving the clutch 82 in a disengaged state to prevent the transfer of power from the engine 12 to the air compressor 16. For example, if the system 10 has just been started and the clutch 82 was automatically disengaged at startup, the electronic control 84 may continue to output a signal to maintain the clutch 82 in a disengaged state until a compressor request is received.

When it is determined that there is a compressor request at block 104, the system 10 may then take steps to bring the air compressor 16 on-line. As depicted at block 108, in response to the compressor request, the system 10 may determine the lowest acceptable engine speed. An embodiment may include the electronic control 84 monitoring various parameters of the engine 12 as well as other parameters with the system 10 to determine the engine speed that will reduce the shock to the system 10 when the air compressor 16 is engaged. For example, the electronic control 84 may check various inputs to determine the devices that are currently drawing power from the engine 12. The devices may include the generator 14 and/or other components consuming power output by the engine 12. According to the power desired by these devices, as well as the power desired to engage the air compressor 16, the electronic control 84 may determine the lowest speed of the engine 12 to operate all of the devices. For example, the electronic control 84 may consider setting the engine speed in a range from about 1800 rpm to 3600 rpm. In an embodiment, the electronic control 84 may set the lowest speed at various increments, such as increments of 200 rpm, based on the desired engine speed. An embodiment may also include setting the speed of the engine 12 to any speed within a given range, based on the determination of the lowest speed. Providing settings that are incremental or that may be varied infinitely may depend on the ability of the electronic control 84 to resolve an accurate speed and the capability of the governor 80 to regulate the engine 12. Other parameters may also be considered to determine the lowest engine speed 108. For example, embodiments may include monitoring the engine temperature, the oil temperature, the oil pressure, and the like. Other considerations may include determining whether the loads being serviced, such as welding or AC power, may be reduced without lowering their performance below an acceptable level. Based on such parameters, the electronic control 84 may assess the operating conditions and limitations to determine the lowest acceptable engine speed.

The system 10 may then check to determine if the engine speed is at or below the lowest acceptable engine speed, as depicted at block 110. In an embodiment, the electronic control 84 may monitor an input signal indicative of engine speed and compare the signal to the lowest acceptable engine speed, determined previously at block 108. If the system 10 determines that the current engine speed is not at or below the lowest acceptable level, the system 10 may lower the engine speed to the lowest acceptable engine speed, as depicted at block 112. For example, if the electronic control 84 determines that the input signal indicates an engine speed that is above the lowest acceptable level, the electronic control 84 may output a signal to the governor 80 that is configured to lower the engine speed. In response to the signal from the electronic control 84, the governor 80 may regulate the speed of the engine 12, as desired. For example, the governor 80 may implement an on-board routine to reduce the engine speed below the desired level, or the governor 80 may incrementally reduce the engine speed and allow the loop illustrated by blocks 104, 108, 110 and 112 to verify that a compressor request is still active and continue to command a reduction in the engine speed until the engine speed is at or below the lowest acceptable level.

The system 10 may engage the compressor, as depicted at block 114, when the engine speed is at or below the lowest acceptable level, as determined at block 110. In an embodiment, engaging the air compressor 16 may include the electronic control 84 outputting a signal configured to engage the clutch 82. As described previously, the signal may include a digital clutch signal or an analog clutch signal transmitted by the electronic control 84 to the clutch 82. Once the compressor is engaged 114, the system 10 may then bring the engine 12 to the desired speed, as indicated by block 116. In an embodiment, bringing the engine to the desired speed 116 may include transmitting signals to the governor 80 to regulate the engine 12 to a desired operating speed. For example, the electronic control 84 may transmit a signal indicative of the desired speed to the governor 80. In turn, the governor may enable the engine 12 to operate at an increased operating speed. The process of bringing the engine to the desired speed 116 may include a series of speed increases, such as incremental stepping of engine speed through the various levels, or may include a single command to increase the engine speed to a given level (e.g., gradually ramp up to the desired speed over a time period). Accordingly, block 116 may include a subroutine or several commands to bring the engine 12 up to speed or may include a single command for the engine to operate at a desired speed.

To monitor the status of the compressor request, the system 10 may include a routine that returns to the check for compressor request at block 102 and continues to cycle through the routine illustrated by FIG. 5. For example, as depicted, the return from block 116 to block 102 enables the system 10 to continuously scan for a compressor request and to respond accordingly. Thus, the system 10 may continuously scan for a compressor request 102, such as a request from the user interface 86, and disengage the compressor 106, regulate the engine speed 112 and/or engage the compressor 114.

Further, the routine depicted in FIG. 5 may continue to run until the system 10 is shutdown. For example, the electronic control 84 may continue to monitor and regulate the engine 12, the governor 80, and the clutch 82 and the routine may terminate upon shutdown of the electronic control 84. Accordingly, the method depicted in FIG. 5 may include a technique to provide a "soft start" of the compressor 16 when the system 10 is started or the compressor 16 is started while the system 10 is already operating. In other words, the system 10 may implement a method to reduce the shock to the system 10 when the compressor 16 is started, whether the system 10 is just starting or the system 10 is running at an operating speed when there is a request to turn on the air compressor 16. Again, the soft start may include reducing the engine speed, engaging the clutch, gradually ramping up the engine speed, gradually increasing engagement of the clutch, gradually increasing tension in the belt 30 relative to the pulleys 24 and 28, or a combination thereof.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising: a portable unit, comprising: an engine; a generator coupled to the engine; a compressor coupled to the engine; and a controller configured to soft start the compressor to reduce shock to the system; comprising a first pulley coupled to a first shaft of the engine, a second pulley coupled to a second shaft of the compressor, and a belt disposed in tension about the first and second pulleys, wherein the controller is coupled to a tensioner configured to increase or decrease tension of the belt during the soft start of the compressor to reduce shock to the system.

2. A system, comprising: a controller configured to soft start an air compressor to reduce shock to the system in a portable welding unit having the air compressor, an engine coupled to the air compressor, and a welding generator coupled to the engine; wherein the controller is configured to reduce speed of the engine prior to engaging the engine with the air compressor in response to a request to soft start the air compressor.

3. The system of claim 2, wherein the controller is configured to gradually increase the speed of the engine after engaging the engine with the air compressor during the soft start of the air compressor to reduce shock to the system.

4. The system of claim 2, wherein the controller is configured to engage a clutch between the engine and the air compressor after reducing the speed of the engine during the soft start of the air compressor to reduce shock to the system.

5. The system of claim 4, wherein the controller is configured to gradually increase engagement of the clutch between the engine and the air compressor during the soft start of the air compressor to reduce shock to the system.

6. A method, comprising: soft starting an air compressor in a portable welding unit having the air compressor, an engine coupled to the air compressor, and a welding generator coupled to the engine, wherein soft starting the air compressor comprises reducing a load or shock of the air compressor on the engine during startup of the air compressor; wherein soft starting the air compressor comprises reducing speed of the engine and gradually increasing speed of the engine after engagement of the air compressor with the engine.

7. A method, comprising: soft starting an air compressor in a portable welding unit having the air compressor, an engine coupled to the air compressor, and a welding generator coupled to the engine, wherein soft starting the air compressor comprises reducing a load or shock of the air compressor on the engine during startup of the air compressor; comprising receiving a request to operate the air compressor, determining a minimum engine operating speed based on a system parameter, checking an actual engine speed to determine if the actual engine speed is at or below the minimum engine operating speed, reducing the actual engine speed to a level at or below the minimum engine operating speed, engaging a clutch, and increasing the actual engine speed to a level greater than the minimum engine operating speed.

8. A system, comprising: a portable unit, comprising: an engine; a generator coupled to the engine; a compressor coupled to the engine; and a controller configured to soft start the compressor to reduce shock to the system; wherein the controller is configured to reduce speed of the engine prior to engaging the engine with the compressor in response to a request to soft start the compressor, the controller is configured to engage a clutch between the engine and the compressor after reducing the speed of the engine, the controller is configured to gradually increase engagement of the clutch between the engine and the compressor, and the controller is configured to gradually increase the speed of the engine after engaging the engine with the compressor via the clutch.

* * * * *